United States Patent Office

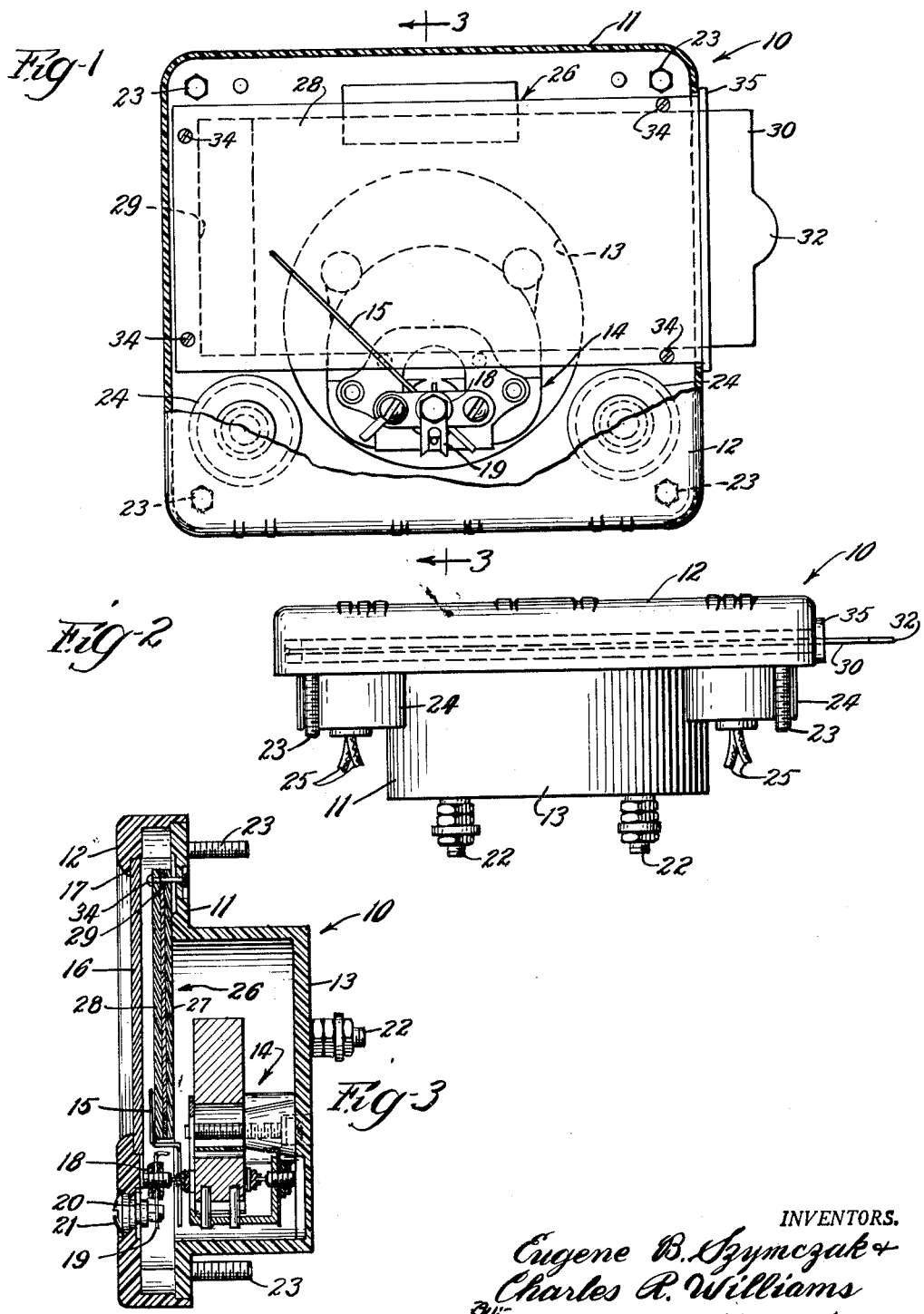

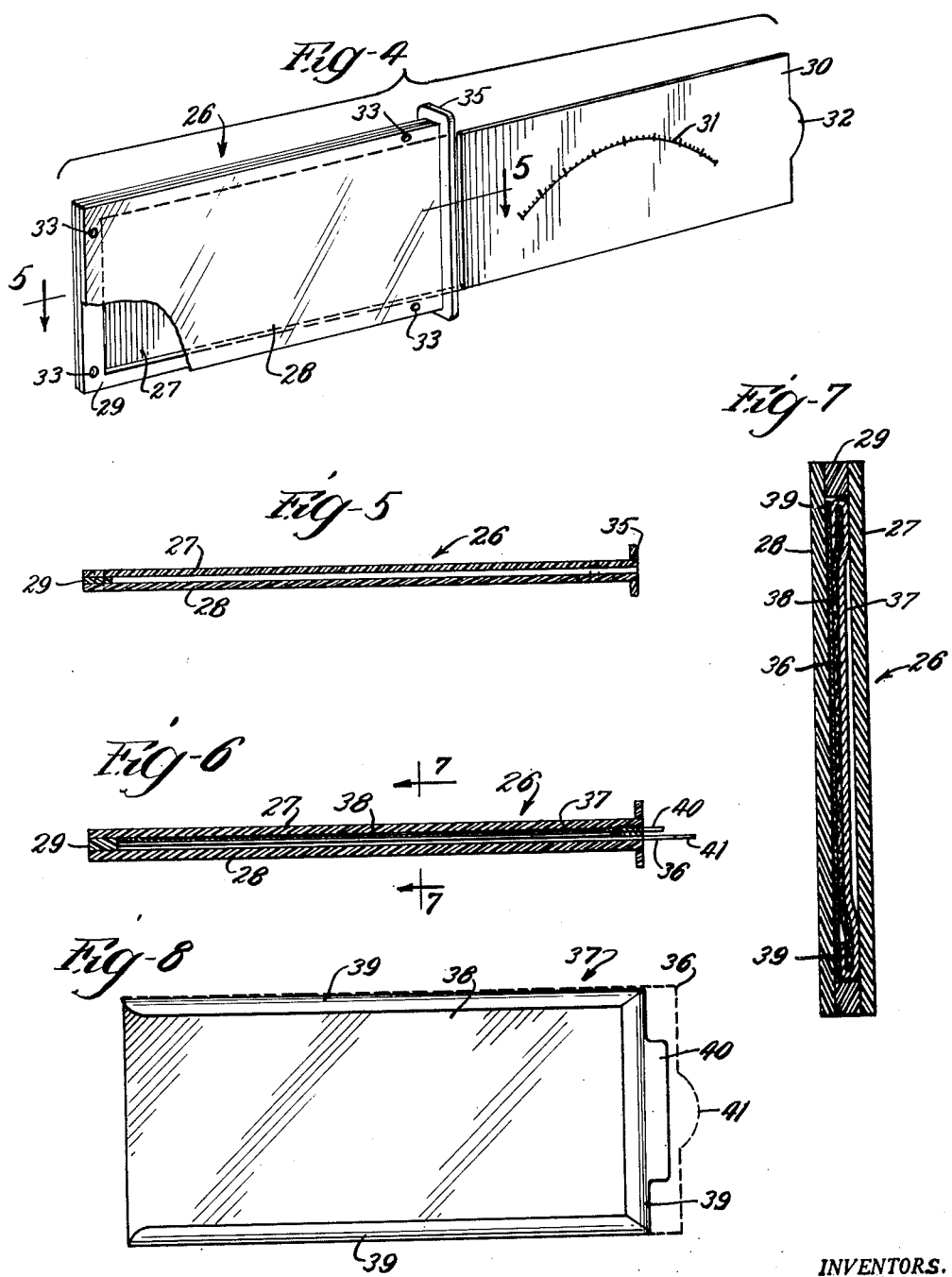

3,050,682
Patented Aug. 21, 1962

3,050,682
REMOVABLE SCALE METER
Eugene B. Szymczak, Chicago, and Charles R. Williams, Berkeley, Ill., assignors to The Welch Scientific Company, a corporation of Illinois
Filed Apr. 11, 1960, Ser. No. 21,469
4 Claims. (Cl. 324—115)

The present invention is directed to a new and improved meter of the type used in measuring potentials including therein potential receiving and disseminating means operating a movable indicator in the form of a needle. More specifically, the present invention is directed to a new and improved meter of the type described including therein a scale housing arranged to hold and permit ready insertion and removal therefrom of a scale for use with the movable indicator means.

Meters of the type commonly used at the present time are in most instances D'Arsonval type galvanometers capable of converting an electrical current into mechanical movement which is indicated by a pointer or indicator of needle type. In protecting the potential receiving and disseminating means against dust and other extraneous effects, the mechanical movement and pointer are housed in a dust-tight metallic or non-metallic case provided with a window through which the pointer and its movement may be observed. Normally received within the case is a suitable scale located directly behind the movable pointer and provided with indicia identifying the quantity and type of units to be measured by the meter. As is generally the case, a meter is designed into a unit as an integral part thereof to perform a specific task as dictated by the application of the overall unit. For example, the meter may be associated with a bridge circuit to indicate potential differences or it may be tied into an amplifier and a detecting device to indicate the quantity of pressure, gas, heat, etc. Meters are also used as a gauge for comparative purposes rather than quantity measurement.

The common practice of using specially designed and often built-in meters for specific installations has developed generally due to the lack of versatility of variable usage in meters. While all meters are not necessarily limited to perform a single function, they are nevertheless limited as to the number of multi-purposes for which they can be used. With dual usage, such as present in a volt-ohm meter, it is generally the case that the dual purposes must be rather closely related for adequate meter performance. These limitations arise from the fact that the use of a permanent scale in a meter does not permit any substantial multi-purpose meter utilization.

The number of functions that one meter can perform is definitely limited. The use of a permanently attached meter face which is scanned by the pointer limits the number of scales that can be placed on or carried by the meter face for the indication of separate and distinct functions. The maximum number of functions which a single meter can perform depends on how closely the various scales can be placed with respect to one another on the meter face while remaining readable and accurate.

In the use of permanent scales, the changing of the type or quantity of units being measured necessitates meter disassembly for scale replacement purposes. External meter scale placement methods have been used but have not been found entirely acceptable. One method followed includes the addition of readable marks or markings on the meter window of the housing. This method is subject to the same limitations as the use of a permanent scale internally of the housing as the window area limits the amount of information that can be stored thereon. Another method includes the use of replaceable, adhesively secured scale tapes applied to the housing window. Here again, information storage is limited and due to the increased distance between the information and the pointer, as compared with an internally mounted scale, inaccuracies are encountered in the form of parallax. Illumination of external scales also presents a problem particularly where the meter is to be used in subdued light.

It is an object of the present invention to provide a new and improved meter of the potential measuring type having means provided therein for removably receiving and holding multi-purpose meter scales, the structural features and arrangement of the scale receiving means completely eliminating meter disassembly for scale replacement purposes and all attendant disadvantages thereof as well as those present where external application methods are utilized.

A further object is to provide a new and improved potential measuring meter which not only provides for a new and improved scale replacement procedure but also permits special scale preparation to meet any and all variable uses of the meter.

Still a further object is to provide a new and improved potential measuring meter including means whereby special scales may be prepared and calibrated with meter operation and utilized therewith in an efficient and time-saving manner.

Other objects not specifically set forth will become apparent from the following description made in conjunction with the drawings wherein:

FIG. 1 is a face elevation of the meter of the present invention having a portion of the face plate thereof broken away to illustrate the scale housing forming a part thereof;

FIG. 2 is a bottom plan view of the meter of FIG. 1;

FIG. 3 is a vertical section of the meter of FIG. 1 taken generally along line 3—3 therein;

FIG. 4 is a perspective of the scale housing illustrating a removable scale therewith;

FIG. 5 is a longitudinal section of the scale housing of FIG. 4 taken generally along line 5—5 therein;

FIG. 6 is a longitudinal section of the scale housing illustrating a modified use thereof;

FIG. 7 is an enlarged vertical section of the scale housing of FIG. 6 taken generally along line 7—7 therein; and FIG. 8 is a front elevation of a photo-sensitive unit suitable for use with the scale housing of the present invention.

The meter 10 of FIGS. 1–3 includes a main housing 11 formed from any suitable material, such as molded plastic. The housing 11 includes a peripheral, radially flanged portion which has suitably mounted thereon an apertured face plate or cover housing 12 secured thereto by any suitable means (not shown). The cover housing 12 may also be formed from molded plastic. The main housing 11 is provided generally centrally thereof with a rearwardly extending, circular enlargement 13 which has suitably mounted therein a potential receiving and disseminating mechanism generally designated by the numeral 14. Mounted on this mechanism is a movable indicator means in the form of a pointer 15 which is positioned to move directly behind a transparent window member 16 (FIG. 3) suitably received in a rectangular opening 17 molded in the face of the cover housing 12. A pointer positioning mechanism 18 forms a part of the meter 10 and is provided with a toggle 19 which has received therein a pin 20 eccentrically carried on a screw element 21 which extends through the face of the cover housing 12 and is suitably carried therein for rotation to calibrate and adjust the position of rest of the pointer 15.

The general meter housing structure is completed by the provision of meter terminals 22—22 carried on the } rear face of the main housing 11 and suitably electrically connected to the pointer operating mechanism 14. A plurality of meter mounting screws 23 are carried by the main housing 11 and project rearwardly therefrom adjacent the corners thereof for mounting of the meter relative to an instrument with which it is intended to functionally perform. The main housing 11 is also provided with dial light housings 24—24 which are translucent and which receive therein suitable light bulbs (not shown) having rearwardly exposed leads 25—25 for suitable connection to a source. The light bulbs upon energization illuminate the dial light housings with an even glow emanating therefrom to illuminate the scale of the meter received in the housing members thereof.

The elements described above are entirely conventional and for this reason descriptive detailing thereof has been omitted. In other words, the basic meter structure described and illustrated conforms to standard type meter design and it will be understood that the inventive concept to be described below is adapted for use with any type of suitable meter design. In particular, the pointer operating mechanism 14 has not been described in detail as the mechanism illustrated is conventional and does not form a part of the present invention.

The meter 10 is greatly improved in its effective utilization by the provision therein of a transparent scale housing 26. This housing is better illustrated in FIGS. 4 and 5. The scale housing 26 is formed from a pair of spaced, generally rectangular plates 27 and 28 which are interconnected in spaced relation by an intermediate marginally located band 29 which is of generally U-shape. The band 29 extends continuously along opposite side margins of the plates 26 and 27 and one end margin thereof while the remaining end margin is open to thus define a scale housing having one end surface open for receiving therein a blank 30 constituting a scale being provided with suitable indicia 31 thereon. The scale 30 readily slides into and out of the scale housing 26 and is preferably provided with a tab-like projection 32 at the outermost end thereof which projects outwardly of the scale housing 26 for ready grasping for scale removal purposes.

The scale housing 26 including the parts 27—29 is preferably formed from plastic material with all of the parts thereof being completely transparent although it is necessary only that the face plate 28 be transparent for observation of the indicia 31 carried on the scale 30. The plates 27 and 28 may be secured to the band 29 in any suitable manner such as by adhesive. Marginal portions of the scale housing are provided with screw receiving apertures 33 for mounting of the scale housing in the meter 10 as illustrated in FIGS. 1–3.

One side wall of the cover housing 12 is slotted to permit end extension of the scale housing 26 outwardly of the meter 10 when the scale housing is operatively mounted therein. The scale housing 26 extends across the face of the main housing 11 of the meter 10 slightly above the base of the pointer 15 to permit sweeping of the scale housing 26 by the pointer 15 during operation of the meter. The offset positioning of the scale housing 26 relative to the rearwardly directed extension 13 of the main housing 11 aligns the screw receiving openings 33 with the radially directed flange and frame-like portion of the main housing 11. As particularly illustrated in FIG. 1, screws 34 are inserted through the openings 33 and the scale housing 26 and suitably attached to the main housing 11 to hold the scale housing 26 in operative position.

The open end of the scale housing 26 projecting outwardly of the meter housing is provided with a radially directed sealing flange 35 which is dimensioned to overlap adjacent edge portions of the meter housing and completely close off the opening therein through which the scale housing 26 extends. The purpose of the flange 35 is to provide a dust-tight seal to prevent entry of foreign matter into the meter, which matter can interfere with efficient meter operation. With the particular structural features of the scale housing 26 and the manner of mounting the same in a meter, the meter itself is completely sealed off from the exterior and the only opening interiorly thereof is the relatively narrow slot formed in the scale housing for receiving therein the removable scale 30. Consequently, scale replacement does not necessitate meter disassembly and the scale at all times is mounted in close association with the movable pointer 15 for accurate operational use of the meter 10.

It will be appreciated that the provision of the removable scale feature completely eliminates the various disadvantages discussed above which are present in standard meter structures. Any desired scale may be used with the meter of the present invention and there are no limitations in this respect as to variable use of the meter itself. With the removable scale feature, there is no need to crowd the face of the scale and possibly reduce the accuracy of the meter readings by printing thereon different scale indicia for variable measurement purposes. Furthermore, as shown in FIG. 4, the indicia 31 carried on the scale 30 may be unnumbered for specialized calibration purposes with the user merely noting pointer positions relative to the indicia 31 and subsequently identifying these positions with the addition to the scale 30 of suitable numbers. This feature is not present in conventional meters without either necessitating disassembly of the meter or using external scales which create the problem of parallax.

Another important use of the sacle housing 26 of the present invention is illustrated in FIGS. 6 and 7. Received in the scale housing 26 is a removable opaque slide 36 positioned immediately behind the front plate 28 of the housing. Rearwardly of the opaque slide 36 is an apaque photo-sensitive paper mount 37 carrying therein on the front face thereof a piece of photo-sensitive paper 38. The mount 37 is clearly illustrated in FIG. 8 and can be formed of any suitable relatively rigid material provided with inwardly folding marginal portions 39 which clamp to the face thereof a piece of photo-sensitive paper 38. One end margin of the mount 37 includes a projecting flange-like tab 40 which remains outwardly of the scale housing 26 as illustrated in FIG. 6 for ready grasping to remove the mount 37 from the housing. The oqaque slide 36 is of greater length than the mount 37 as illustrated in FIG. 8 and also includes a projecting tab-like portion 41 which projects to a greater extent that the tab 40 outwardly of the scale housing 26.

In using the unit illustrated in FIGS. 6–8, the scale housing 27 is loaded for pointer positioning recording purposes. The opaque slide 36 covers the unexposed photo-sensitive paper 38 and when exposure is desired for purposes of recording pointer positioning, the opaque slide 36 may be withdrawn and subsequently returned into paper covering relation to complete the exposure. In this manner the user of the meter 10 may prepare his own special scales derived from a series of recorded pointer positions as a result of a plurality of photographic exposures of the type described.

In connection with photographic use of the scale housing 26 of the present invention described above, it will be understood that this particular use is merely illustrative. In other words, it is within the scope of the present invention to make advantageous use of photo-sensitive paper in the scale housing with any suitable procedure being followed to control exposure of the paper. For example, the scale housing 26 may be provided with an opaque back plate 27 thus eliminating the necessity of utilizing the paper holder 37. Furthermore, the slide 36 may be formed from transparent material carrying thereon unnumbered scale indicia such as 31 illustrated in FIG. 4. In this manner, the scale housing 26 would be loaded with photo-sensitive paper in the dark and the exposure would be obtained by use of a flash of light or other suitable means with the result being that the unnumbered scale carried on the transparent slide 36 as well as the position of the pointer along this scale would be recorded on the photo-sensitive paper. Furthermore, it should be understood that a transparent slide carrying an unnumbered scale of the type described could be placed in between the opaque slide 36 and the photo-sensitive paper holder 37 to record on the paper the unnumbered scale as well as the pointer position.

Obvious certain modifications and variations of the invention as hereinbefore set forth may be made without departing from the spirit and scope thereof, and therefore only such limitations should be imposed as are indicated in the appended claims.

We claim:

1. A meter for use in measuring potentials, said meter comprising a main housing having mounted therein movable indicator means operatively connected and responsive to potential receiving and disseminating means, a scale housing mounted in said main housing and opening outwardly of said main housing along one surface thereof, said scale housing having at least one transparent face and being positioned within said main housing with said indicator means aligned with the transparent face of said scale housing, a transparent scale provided with opaque indicia removably received in said scale housing immediately rearwardly of the transparent face thereof, and photo-sensitive paper removably received in said scale housing rearwardly of said scale to print said indicia and the position of said indicator means upon exposure of said paper to light.

2. The meter of claim 1 wherein said scale housing has received therein an opaque slide covering said photo-sensitive paper, one end of said slide extending outwardly of said scale housing beyond said scale and paper for ready grasping for sliding withdrawal thereof to expose said paper to light.

3. A meter for use in measuring potentials, said meter comprising a main housing having mounted therein movable indicator means operatively connected and responsive to potential receiving and disseminating means, a scale housing mounted in said main housing and opening outwardly of said main housing along one surface thereof to receive removable scales therein, said scale housing being formed from a pair of spaced generally rectangular plates, and a window containing face plate mounted on said main housing outwardly of said scale housing, the outwardly opening portion of said scale housing being peripherally sealed with said main housing and the edge portions thereof within said main housing being sealed to prevent the entry of foreign matter into said main housing, said scale housing having at least one transparent face through which a scale received therein can be observed, said scale housing being positioned within said main housing with the transparent face thereof associated with said indicator means for operative use of a scale received in said scale housing with said indicator means.

4. The meter of claim 3 wherein the outwardly opening portion of said scale housing projects outwardly of said main housing and face plate and is provided with a continuous radial sealing flange overlapping adjacent marginal areas of said main housing and face plate to provide said peripheral seal.

References Cited in the file of this patent

UNITED STATES PATENTS 1,378,983    Smith ---------------- May 24, 1921